Sept. 6, 1949.  J. LEDWINKA  2,481,127
BRAKE ARRANGEMENT
Original Filed Sept. 17, 1943
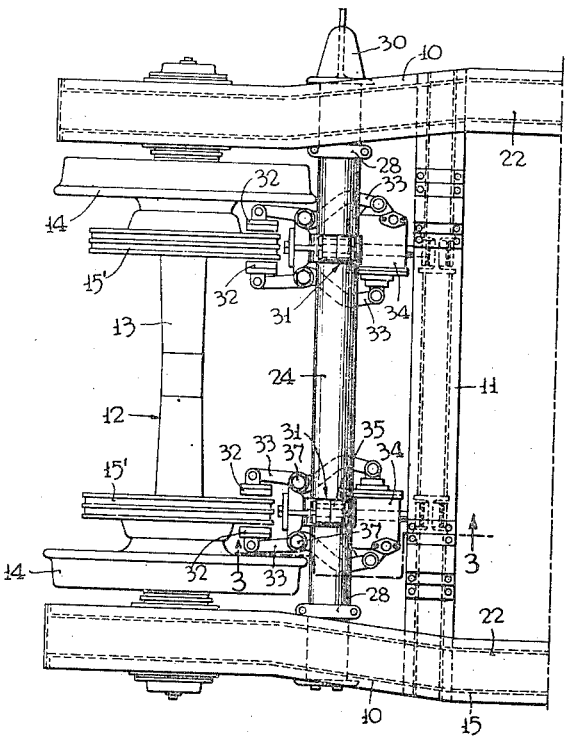
FIG. 1.
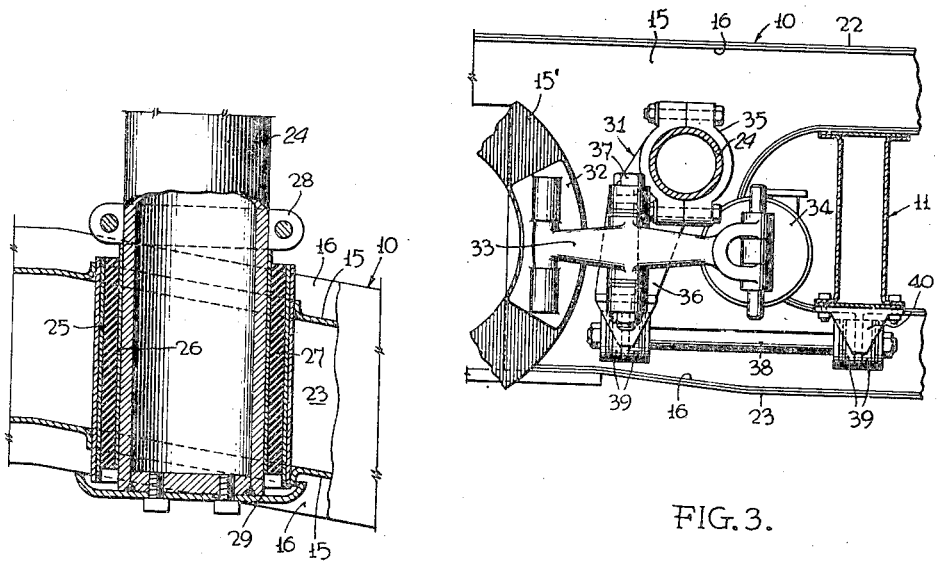
FIG. 2.
FIG. 3.
INVENTOR
Joseph Ledwinka,
BY
ATTORNEY Patented Sept. 6, 1949

2,481,127

UNITED STATES PATENT OFFICE 2,481,127

BRAKE ARRANGEMENT

Joseph Ledwinka, Philadelphia, Pa., assignor to The Budd Company, Philadelphia, Pa., a corporation of Pennsylvania Original application September 17, 1943, Serial No. 502,721. Divided and this application September 4, 1946, Serial No. 694,796

2 Claims. (Cl. 188—59)

This application is a division of copending application Serial No. 502,721 filed September 17, 1943 for Railway truck, now U. S. Patent Number 2,425,282.

The present invention relates to the brake arrangement for association with the truck structure of said prior application or with a different truck structure.

It is an object of the invention to simplify the support of the brake mechanism and to provide for the cushioned support of said mechanism to carry the gravity load substantially wholly from longitudinal side members of the truck which has tilting movement with respect to the wheel and axle assemblies supporting them.

It is a further object to provide simple and efficient means for transmitting the torque load to the truck frame in such manner as to have no substantial effect upon the springing of said frame.

These and other objects and advantages will become more fully apparent from the following detailed description when read in connection with the drawings forming a part of this specification.

In the drawings:

Fig. 1 is a plan view of one-half of a truck showing the invention applied thereto.

Fig. 2 is a detail horizontal sectional view, on an enlarged scale, through the joint between the brake support and a side frame member of the truck, and Fig. 3 is a fragmentary vertical sectional elevational view taken substantially along the line 3—3 of Fig. 1.

In the drawings, the truck frame to which the invention is shown applied consists mainly of two longitudinally extending side members 10 interconnected by a pair of spaced transoms, as 11. Wheel and axle assemblies, designated generally by 12, support the adjacent ends of the side members, through suitable flexible joint structures, not shown in detail herein, which spring the side members from said assemblies and allow relative tilting movement between the wheel and axle assembly and the side members. The side members 10 thus function in a manner similar to the usual equalizers.

The wheel and axle assemblies comprise the axles 13 which carry the wheels 14 with each of which a brake disc 15' is shown associated.

Each side frame member is a hollow box section structure comprised of spaced vertical plates 15, having outwardly directed flanges 16 along their top and bottom margins. Strips 22 and 23, substantially flat in cross section, are connected, as by electric welding to the flanges 16 to complete the box cross-section.

At each end of the truck between the wheels 14 and the adjacent transom 11 is a tubular transverse member 24 which extends through openings in the wall plates 15 of the side frame members 10. This tube is secured to the latter by metal outer and inner sleeves 25 and 26 having a rubber sleeve or bushing 27 interposed between them. The outer metal sleeve is welded in the openings of and forms an additional transverse connection between the plates 15 of the side frames 10.

The rubber bushings cushion the vertical or gravity loads of the transverse member 24, which serves as a brake supporting member, and also permit the relative tilting movements between the side frame members and the axle without placing undue strain on the parts.

Lateral movement of the tubular support 24 is limited by collars 28 clamped about the tube inwardly of the respective side frames 10 and a removable plate 29 at one end of the tubular support and a bracket 30 at the other end. This bracket may have an additional function, not necessary to describe herein. If not needed for this additional function, it may obviously be replaced by another removable plate, similar to plate 29.

The tubular support 24 carries the brake units 31 each including brake shoes 32 for cooperation with the opposite faces of the adjacent disc 15', brake levers 33, one associated with each shoe, and an actuating cylinder 34 interconnecting the lever arms at the ends of the levers opposite the ends carrying the respective shoes.

Each brake unit comprises a bracket clamped firmly to the tubular support at 35 and having a generally vertical downward extension or arm 36, on which the intermediate portions of the brake levers are pivoted at 37.

The torque exerted on each brake unit is taken up and the brake unit is held in place by a longitudinally extending torque rod 38 which is inserted by means of rubber cushions 39 between the free end of downward extension 36 of the respective brake unit and a bracket 40 bolted or otherwise secured to the bottom of the adjacent transom 11. The transom, like the side frame members 10, may be a built-up hollow box section structure similar to said members, as clearly appears in Fig. 3.

With this arrangement, it will be seen that the vertical or gravity loads are of the brake support carried substantially wholly through the rubber cushioned joints to the side frame members 10, these joints also allowing the necessary flexibility to avoid strain on the parts upon relative tilting of the side frame members and axle. The heavy braking torque, on the other hand, is substantially wholly transmitted in longitudinal direction to the truck frame, so as to have no substantial effect upon the truck frame springing.

While the invention has been herein described in connection with a specific truck structure and in detail, it will be understood that it can be applied to other types of truck structures and with different detail and, such changes as would readily occur to those skilled in this art without departing from the main features of the invention are all intended to be covered in the appended claims.

What is claimed is:

1. In a brake arrangement, a wheel and axle assembly, a vehicle frame comprising longitudinally extending side members supported from the respective ends of said assembly, a brake rotor carried by said assembly, a transversely extending brake support carried wholly through cushioned joint structures on said side members, a brake unit carried by said support and including a bracket removably clamped to said support, a brake lever pivoted intermediate its ends to said bracket, a brake stator carried by one end of said lever in cooperative relation to said rotor, and an actuating cylinder connected with the other end of said lever, said bracket having a substantially vertical extension, the free end of which is connected to transmit braking torque to said frame in a direction lengthwise thereof.

2. In a brake arrangement, a wheel and axle assembly, a vehicle frame comprising longitudinally extending side members supported from the respective ends of said assembly, a brake rotor carried by said assembly, a transversely extending brake support carried wholly through flexible joint structures on said side members, a brake unit carried by said support and including a bracket removably but rigidly secured to said support, and itself carrying a stator in cooperative relation to said rotor, a brake lever and an actuating cylinder, and a connection between said bracket and the frame for transmitting braking torque to the frame in a direction lengthwise thereof.

JOSEPH LEDWINKA.

REFERENCES CITED

The following references are of record in the file of this patent:

UNITED STATES PATENTS

| Number | Name | Date |
|---|---|---|
| 2,416,869 | Eksergian | Mar. 4, 1947 |
| 2,423,694 | Eksergian et al. | July 8, 1947 |